United States Patent [19]
Brown, Jr. et al.

[11] 3,795,081
[45] Mar. 5, 1974

[54] PROCESS FOR CONTINUOUSLY FORMING COMPARTMENTED PACKAGES

[75] Inventors: Theodore E. Brown, Jr., Mickleton, N.J.; Frank M. Willis, Hedgesville, W. Va.

[73] Assignee: E. I. du Pont de Nemours and Company, Wilmington, Del.

[22] Filed: Nov. 2, 1972

[21] Appl. No.: 303,054

[52] U.S. Cl. .................. 53/28, 53/180, 93/35 PC
[51] Int. Cl. .............................. B65b 9/12
[58] Field of Search ... 53/28, 138, 138 A, 180, 182; 93/35 PC; 206/47 A

[56] References Cited
UNITED STATES PATENTS
| | | | |
|---|---|---|---|
| 2,040,953 | 5/1936 | Poppe | 93/35 PC |
| 2,913,861 | 11/1959 | MacNeale | 53/28 |
| 3,380,226 | 4/1968 | Tracy | 53/138 A |
| 3,608,709 | 9/1971 | Pike | 206/47 A |

Primary Examiner—Robert L. Spruill

[57] ABSTRACT

A series of multi-compartmented packages is produced continuously by forming a web of film, e.g., biaxially oriented, heat-set polyethylene terephthalate, into a continuously advancing convoluted tube having a partially single-ply and partially double-ply wall, sealing the inner to the outer ply so as to form at least two linear junctures, one adjacent the inner edge and one adjacent the outer edge of the web, thereby forming at least two adjacent compartments with the inner ply common to two compartments, feeding different fluent materials to the different compartments, constricting the loaded tube at spaced intervals and applying a pair of encircling closure means to the constricted areas, and severing the tube between the pair of closure means.

6 Claims, 2 Drawing Figures

PATENTED MAR 5 1974　　　　　　　　　　　　　　3,795,081

PROCESS FOR CONTINUOUSLY FORMING COMPARTMENTED PACKAGES

CROSS-REFERENCE TO RELATED PATENT APPLICATION

U.S. Pat. Application Ser. No. 281,166, filed Aug. 16, 1972.

BACKGROUND OF THE INVENTION

This invention relates to a process continuously forming packages wherein materials, especially reactive materials, are stably maintained in separate compartments, e.g., rock bolt resin packages.

In end-use applications which operate on the basis of a physical change effected in a mixture by a rapid chemical reaction of components thereof, e.g., in the anchoring of a structural element within a surrounding structure by curing of a soft resin composition around the element at ambient temperature to cause the resin to set up hard, it is expedient to pack certain components of the mixture in separate compartments in a unitary package so that the components can be brought together easily in the required proportions by rupture of the compartment wall between them at, or just prior to, the time when the physical change is to be effected, i.e., when the mixture is in proper position at the location of use. Bringing the components together in this manner prevents the physical change from occurring before the mixture has been properly positioned, in which case the mixture would be incapable of functioning as designed.

In one particular end-use of the above type, the quick-setting property of certain resin systems is utilized to fix anchor bolts in drill holes, such bolts being used, for example, as strengthening members in rock formations. First, one or more packages containing a polymerizable resin formulation are inserted into a drill hole, followed by the bolt or reinforcing rod. The latter compresses the resin package(s) towards the bottom of the hole and tears the package(s), and, when rotated, mixes the components thereof, whereupon the resin cures and hardens.

For resin systems which are quick-setting, e.g., on the order of a few seconds, at room temperature, the need for dual-compartment packages to prevent setting before the bolt is in place has been recognized. In such systems, the polymerizable resin composition generally is located in one compartment, and a catalyst composition in the other, and the package is broken and the compositions are mixed at the time that setting is desired.

The cross-referenced U.S. Pat. application describes a tubular compartmented package (e.g., for a rock bolt resin system) of circular cross-section, characterized by a variability in the volume ratio of its compartments and of the material loaded into its compartments, and adapted to have a rigid structure. These design features, of themselves, accord a considerable technical advantage to the package, which would be further augmented if a high-speed method were available for producing the package, e.g., a method wherein packages were continuously produced in a series from a continuously forming and advancing compartmented tube. A method is known for continuously producing a series of non-compartmented packages from a continuous tube, e.g., as described in U.S. Pat. Nos. 2,831,302, issued Apr. 22, 1958, 3,149,447, issued Sept. 22, 1964, and 3,324,621, issued June 13, 1967, all assigned to Oscar Mayer & Co. However, this method produces neither a compartmented tube nor a compartmented package containing different materials in different compartments.

SUMMARY OF THE INVENTION

This invention provides a process for continuously forming a series of compartmented packages, e.g., rock bolt resin packages, which comprises (a) continuously drawing a web of pliable film material, e.g., a polymeric linear terephthalate ester film, into a convoluted cylindrical forming member having at least two tubular filling members passing therethrough, the film material being formed in the forming member into a convoluted tube into which the filling members extend and which has single-ply and double-ply wall portions, the web being drawn into and the convoluted tube being continuously advanced through the past, the forming member by tube-advancing means in frictional engagement with the tube; (b) bringing the continuously advancing convoluted tube into a confronting relationship with at least two sealing means located between the forming member and the tube-advancing means, each of the sealing means producing a seal between a pair of facing surface zones of the inner ply and the outer ply of the double-ply wall portion of the tube in a manner such as to form, as the tube advances, at least two continuous linear junctures between plies substantially parallel to the longitudinal axis of the tube, one of the junctures being adjacent the inner edge of the web and another adjacent the outer edge, each pair of successive junctures and the inner ply therebetween forming two adjacent compartments, each of the filling members extending into a different one of the compartments; (c) continuously feeding a stream of fluent material into the filling members and discharging the material from the filling members into the compartments of the continuously advancing compartmented tube, the material fed into each filling member being different in composition from that fed into every other filling member, and the total quantity of material discharged preferably being sufficient to maintain a substantially circular tube cross-section and a rigid structure; (d) bringing the filled portion of the continuously advancing compartmented tube into periodic engagement with constricting and sealing means which constricts the tube at spaced intervals and applies a pair of successive encircling closure means to each constricted area; and (e) severing the tube in the constricted areas between each pair of closure means.

BRIEF DESCRIPTION OF THE DRAWING

In the accompanying drawing, which illustrates specific embodiments of this invention.

In the drawing, like numerals designate similar parts.

DETAILED DESCRIPTION OF THE INVENTION

Figure 1:
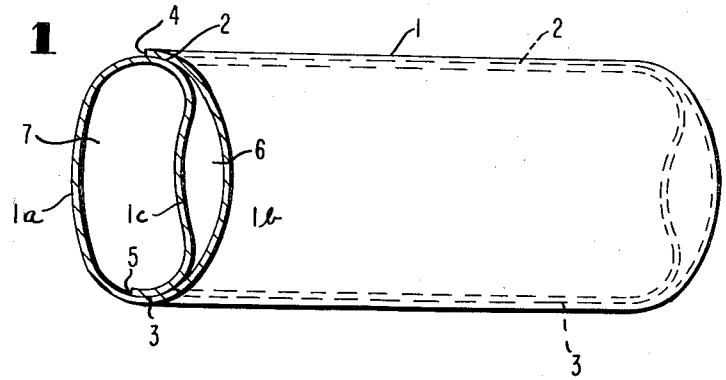
FIG. 1 is a perspective view of a portion of a convoluted tube which has been sealed so as to form a two-compartment tube in accordance with the process of the present invention.

To produce the compartmented package by the process of this invention, a compartmented tube is made by forming a single, continuous web of pliable film material into a continuously advancing convoluted tube having single-ply and double-ply wall portions, and sealing the inner ply to the outer ply of the double-ply wall portion so as to form at least two continuous linear junctures between plies substantially parallel to the longitudinal axis of the convoluted tube. In the two-compartment tube shown in FIG. 1, a single web of film material has been formed into a convoluted tube 1 having a single-ply wall portion 1a and a double-ply wall portion consisting of an outer ply 1b and an inner ply 1c. Plies 1b and 1c have been sealed together at diametrically opposed continuous linear junctures or seals 2 and 3, near outer edge 4 and inner edge 5, respectively, of the web of film. The transverse dimension, or width, of ply 1c is substantially equal to that of plies 1a and 1b. The compartmented tube has two adjacent compartments 6 and 7, which extend throughout the length of the tube, compartment 6 being defined by inner ply 1c, outer ply 1b, and linear seals 2 and 3, and compartment 7 by inner ply 1c, single-ply wall portion 1a, and linear seals 2 and 3. Referring to the compartmented package described in the cross-referenced U.S. patent application, the disclosure of which is incorporated herein by reference, inner ply 1c forms the diaphragm of the package, and outer ply 1b and single-ply wall portion 1a together form the surrounding tubular member.

The compartmented tube is made of a relatively thin, pliable film material, and the loaded package made therefrom can adopt a substantially circular transverse cross-section by virtue of being sufficiently packed with fluent materials. When the tube shown in FIG. 1 is not loaded, inner ply 1c is in a slack condition and can be moved in transverse planes through all positions intermediate a semicylinder in which outer ply 1b lies and one in which single-ply wall portion 1a lies. As a result, while the circular tubular cross-section is maintained, inner ply 1c can adopt a configuration and position conforming to the volumes of materials loaded into each of the two compartments 6 and 7 of which it is a part. Thus, although the total volume of the package is fixed by the area of the circular cross-section and the length of tube 1, the volume ratio of the materials loaded into the respective compartments can be varied by virtue of the mobility and pliability of the diaphragm, which is able to adopt a position and configuration such as to produce a compartmental volume ratio equal to the volume ratio of the materials loaded into the compartments.

Figure 2:
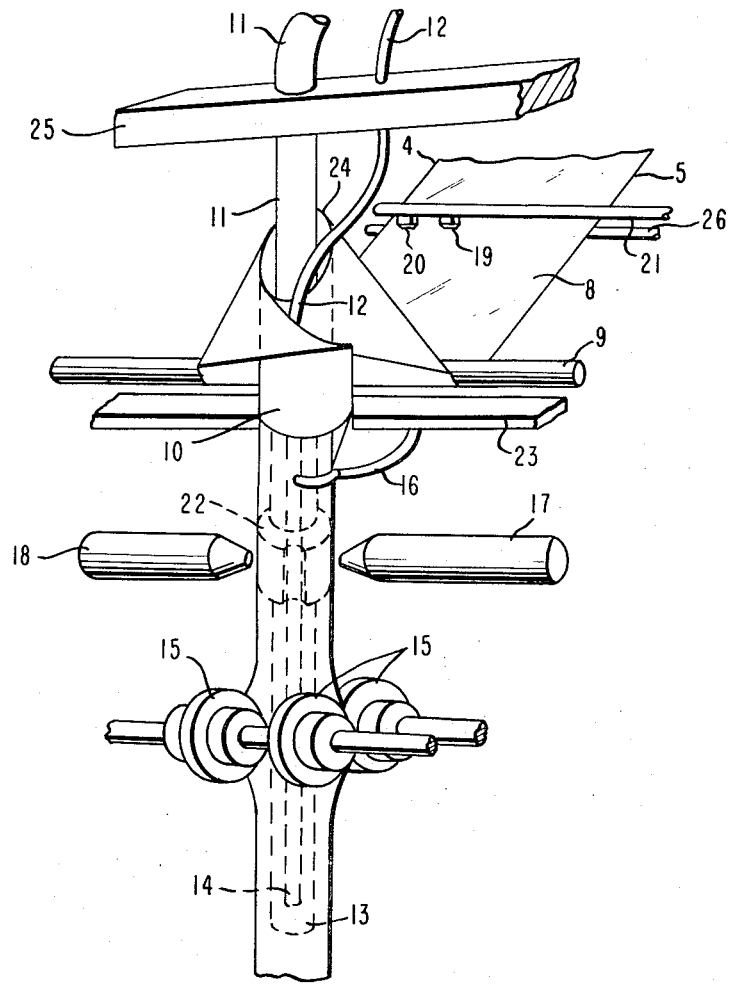
FIG. 2 is a perspective view of a portion of a packaging machine which may be employed for carrying out the present process.

The formation of a convoluted tube such as that described above and the formation and filling of the compartments in the compartmented tube, can be accomplished in a tube-forming, -sealing, and -filling apparatus such as that shown in FIG. 2, which apparatus can be used in conjunction with a tube-feeding device such as one described in U.S. Pat. No. 2,831,302 or 3,149,447, and a constricting, sealing, and severing unit such as one described in U.S. Pat. No. 2,831,302 or 3,324,621. The disclosures of these patents are incorporated herein by reference.

The process of the invention will now be described by way of an example as applied to the formation and loading of the compartmented tube shown in FIG. 1 by means of the apparatus shown in FIG. 2, and to the constriction, sealing, and severing of the tube to produce a series of compartmented packages.

EXAMPLE

A continuous web 8 of biaxially oriented, heat-set polyethylene terephthalate film, 4.5 inches wide and 0.0015 inch thick, moves continuously from a supply roll (not shown), passing under guide bar or roller 9 and thence upwardly and over the upper curved edge 24 of convoluted cylindrical forming member 10 and down around two hollow tubular filling members, i.e., tubular filling mandrel 11 and filling tube 12. The forming member 10, which is mounted in upstanding relation on a cross bar 23, is cut and shaped to form a convolute around filling mandrel 11 and filling tube 12, the upper edge 24 of the convolute being shaped or cut away to cause web 8 to reverse its direction and to guide edges 4 and 5 of web 8 downwardly into a convoluted tube-forming relation around mandrel 11 and tube 12. Convoluted cylindrical forming member 10 is made from a flat plate having the general form of an angle-truncated isosceles right triangle from which the base angles have been truncated normal to the base leaving a 5-inch remaining base and an arcuate portion opposite thereto, the latter being the arc of a circle whose radius is 1-½ inches and whose center is on a 2-15/16 -inch line which connects the center of the arc and the base (normal thereto) so as to divide the latter into 2-¼-inch and 2-¾-inch sections. The sides of the triangle are tangents to the arc which form 45° angles with the base of the triangle. The plate is rolled to form a convolute, with the truncated edge which is 2-¼ inches from the arc-bisecting line as the inside edge, so that the convolute has an inner diameter of approximately 13/16 inch and an outer diameter of one inch.

Filling mandrel 11 (outer diameter ½ inch) extends vertically through the inner tubular portion, and filling tube 12 (outer diameter 3/16 inch) between overlapping portions, of convoluted cylindrical forming member 10. Mandrel 11 and tube 12 extend vertically through a frame cross bar 25 and are each connected by a supply tube to a pump which continuously delivers fluent material thereto. The discharge end 13 of mandrel 11 and the discharge end 14 of tube 12 are located below two cooperating pairs of feed rollers 15, each pair of rollers engaging opposite sides of the compartmented tube for the continuous advancement thereof toward a tube-constricting and -sealing unit.

As the film advances over and into convoluted cylindrical forming member 10 around mandrel 11 and tube 12, it is formed into a convoluted tube having an approximately half single-ply and half double-ply wall, and a ⅞-inch outer diameter, the outer ply 1b of the double-ply portion near the outer edge 4 of web 8 being urged into contact with the inner ply 1c by means of arcuate guide means 16. The advancing convoluted tube is formed into a two-compartment tube by virtue of the formation of two diametrically opposed linear seals 2 and 3 between the inner and outer plies of the double-ply half of the tube. To accomplish the sealing, the convoluted tube moves continuously at a speed of 45 feet per minute into the path of two hot air jets emanating from air heaters 17 and 18, each air jet being directed toward a circular zone in the tube's outer surface in the double-ply half of the tube ¼-inch away from the inner and outer edges of web 8. These zones, which are diametrically opposed, overlie corresponding zones of the inner surfaces of the convoluted tube to which benzyl alcohol has been applied, the alcohol having been applied to the web by means of felt wicks 19 and 20, which are supported on applicator rod 21 and communicate with a benzyl alcohol supply vessel (not shown). Rod 21 is opposed by rotating idler rod 26 over which web 8 flows. Application of the benzyl alcohol in this manner results in two continuous ½-inch-wide alcohol-treated stripes or bands on the inner surface of the outer ply of the double-ply portion of the convoluted tube ¼-inch away from the inner and outer edges of web 8. The benzyl alcohol exerts a type of solvent action on the polyethylene terephthalate film at elevated temperature, which action allows the treated surface to be heat-sealed while moving through the heating area at a rapid rate. The air velocity from the air jets is 300 feet per second, the air temperature is 900° F, the diameter of the air jet holes in the tips of air heaters 17 and 18 is ⅛ inch, and the distance between the air heater tips and the film surface is ⅛ inch. The hot air jets produce continuous, 3/16-inch-wide, diametrically opposed linear seals 2 and 3 between the plies in the underlying benzyl-alcohol-treated zones in the polyethylene terephthalate film. The inner ply 1c becomes a slack diaphragm which can be moved in transverse planes, and the outer ply 1b, together with the half single-ply portion 1a of the tube, forms a tubular member of circular transverse cross-section. The transverse dimension of inner ply 1c is substantially equal to that of outer ply 1b. As the convoluted tube moves into the path of the air jets, it passes over sizing ring 22 so that the tube has the required ⅞-inch outer diameter as the seals are made. Mandrel 11 passes through the axial bore in ring 22, and filling tube 12 fits into a notch in the periphery of ring 22, passing between inner ply 1c and outer ply 1b. Discharge end 13 of mandrel 11 communicates with continuously advancing compartment 7, formed by inner ply 1c, single-ply wall portion 1a, and continuous linear seals 2 and 3. Discharge end 14 of filling tube 12 communicates with continuously advancing compartment 6, formed by inner ply 1c, outer ply 1b, and continuous linear seals 2 and 3.

A stream of fluent material emanates continuously from discharge end 13 and discharge end 14 as the compartmented tube is advanced beyond ends 13 and 14, the materials thus entering compartments 6 and 7 of the continuously advancing tube immediately after the compartments are formed in the linear sealing operation. The formation of individual packages from the continuously advancing loaded compartmented tube is accomplished by a reciprocable tube-constricting, -sealing, and -severing unit located below the filling location, i.e., below discharge ends 13 and 14. This unit is mounted for reciprocation at regular intervals in the direction of advancing axial movement of the tube. The unit, which is described in detail in the aforementioned U.S. Pat. No. 2,831,302, constricts the moving loaded compartmented tube at predetermined spaced intervals along an extended area and simultaneously positions and clinches around the constricted area, in spaced relation, a pair of closure bands or clips which are preformed and delivered to the unit in timed relation to the movement of the constricting mechanism. The unit also severs the compartment tube between the closures to provide successive individual packages which are closed at opposite ends by the closure members. Severing of the tube also can be accomplished by a means distinct from the constricting and sealing means, however.

The material delivered to mandrel 11 is a fluent paste-like material consisting of a polyester resin (an inhibited reactive mixture of a resin prepared by reacting maleic anhydride and a saturated polycarboxylic acid with one or more glycols, and styrene), a major amount of an inert filler, a promoter, a thixotropic thickening agent, and a dye. The material delivered to filling tube 12 is a fluent paste-like material consisting of a catalyst or initiator for the resin system, an inert filler, and a thixotropic thickening agent. The pumps which deliver the materials to mandrel 11 and filling tube 12 are adjusted so that the total weight of material delivered to the compartmented tube, moving at 45 feet per minute, is about 0.5 pound per foot, the weight ratio of material in compartment 7 to that in compartment 6 being about 12 to 1 (about 9 to 1 by volume). Proper adjustment of the pumps and the speed of feed rollers 15 provides the quantity of material desired in a given length of tube.

The length of the individual packages formed from the loaded compartmented tube is controlled by adjusting the speed of the constricting, sealing, and severing unit relative to the speed with which the tube is advanced. Some 18-inch packages are produced at a rate of about 30 per minute, and some 27-inch packages at a rate of about 20 per minute. The packages are firm, rigid, and uniform in diameter, and have the stability and strength described in the cross-referenced U.S. Pat. application.

The compartmented tube is made of a pliable film material which is strong enough to protect the package contents under the conditions the package will encounter in use, but at the same time is sufficiently thin and pliable that it will not interfere with the utility of the package contents, e.g., with the reaction of reactive components therein when the package has been deliberately broken. Any film material which affords the required properties can be employed, e.g., polyethylene, cellophane, vinyl polymers such as polyvinylidene chloride, polymeric linear terephthalate esters such as polyethylene terephthalate, etc. For packaging rock bolt resin systems, polyethylene terephthalate film is especially preferred because of its strength, inertness with respect to the package contents, and imperviousness to vapors such as those which may issue in the case of styrene-containing systems. Polymeric terephthalates should be in a biaxially oriented, heat-set form as described in U.S. Pat. No. 2,820,735, issued Jan. 21, 1958, to L. E. Amborski.

The procedure used to seal the inner ply to the outer ply of film material to form the compartmented tube can be any technique which can provide seals of the required strength and tightness with the particular film used. On the basis of convenience and seal strength, heat seals are preferred, such as those produced by the electronic sealing mechanism described in the aforementioned U.S. Pat. No. 2,831,302, heated rolls or bars which apply sealing pressure as well as heat, or hot air jets. For sealing a biaxially oriented film of polymeric linear terephthalate, e.g., polyethylene terephthalate, which film cannot be effectively heat-sealed to itself, the film can be laminated with a heat-sealable film in the zones where the linear junctures are to be made, but a preferred procedure is to apply a solvent or sealing agent such as benzyl alcohol to the web of film material prior to the formation of the convoluted tube in a manner such that one or both of the facing surfaces of the inner and outer plies of the double-ply portion of the convoluted tube is coated with a layer of sealing agent in the zones adjacent the inner and outer edges of the web, as well as other zones therebetween if required, where the continuous linear heat seals are to be made. Excess sealing agent can be applied adjacent the zones to be sealed inasmuch as the excess can be permitted to escape upon the application of heat to the outer surface overlying the coated zones. In any case, the application of sealing agent is effected in a manner such that two or more continuous treated stripes or bands are produced, one such stripe, or strip-like zone, being produced adjacent each edge of the web. Any of the sealing agents and application techniques disclosed in co-pending, co-assigned U.S. Pat. Application Ser. No. 281,165, filed Aug. 16, 1972, by W. J. Simmons, can be employed, the disclosure of the latter application being incorporated herein by reference.

The formation of the linear heat seals with films of polymeric linear terephthalate esters is effected by applying heat to the outer surface of the convoluted tube in zones which overlie the coated inner surface zones. Any type of heating technique can be employed, but a highly preferred method is the one described in the aforementioned U.S. Application Ser. No. 281,165, which method involves the impingement of a hot gas stream on the surface and is especially adaptable for high-speed sealing operations. The surface zones which have been treated with the sealing agent, e.g., benzyl alcohol, are brought together, and a gas stream, e.g., air at a temperature in the range of about from 290° C to 700° C and delivered at a linear velocity in the range of about from 100 to 500 feet per second, is impinged on the corresponding outer surface zones. Polymeric linear terephthalate ester films self-sealed in this manner are preferred over laminated terephthalate films wherein the bond zone between the terephthalate and the other film may fail and in effect destroy the seal.

Heat seals preferably are made at a slight distance from the edges of the web so as to avoid the application of heat to the single-ply wall portion of the convoluted tube, which condition could cause a burn-through of the film. A distance of about 1/16 to ¼ inch between the seal and the edge of the web is satisfactory. The width of the juncture is not critical, widths of about 1/16 to ¼ inch usually being satisfactory. The linear juncture adjacent the inner edge of the web, i.e., edge 5 in the compartmented tube shown in FIG. 1, can be made by an indirect sealing technique rather than by a direct sealing of film surface to film surface. However, direct sealing as described above is preferred for forming all linear junctures as this assures the greatest control of compartmentalization of the different components in the packages.

The number of continuous linear junctures made between plies is at least two, i.e., one adjacent the inner edge of the web of film and one adjacent the outer edge. However, more than two continuous linear junctures can be made to provide more than two compartments, e.g., three junctures for three compartments, etc., as shown in FIG. 3 of the U.S. patent application cross-referenced above. To form the additional junctures, one or more additional heating elements are mounted around the periphery of the advancing convoluted tube along with those employed to seal near the web edges, e.g., air heater 17 and 18 in FIG. 2. If pretreatment of the surface zones with solvent or sealing agent is required as described above, the additional zones can be treated as described along with the zones near the web edges. The maximum number of linear seals and compartments which can be made naturally is less for smaller-diameter packages considering the mechanical difficulties associated with forming and filling the necessarily smaller compartments. As a practical matter, compartmented tubes and packages of about one inch or less in diameter generally will have no more than two continuous linear junctures and compartments.

In the present process, a continuous web of film is formed into a continuously advancing convoluted tube having single-ply and double-ply wall portions by passage through a convoluted cylindrical forming member (10 in FIG. 2) around an axial mandrel (11 in FIG. 2) in the cylindrical forming member. The forming member has one cylindrical edge surface which is a tapered guiding edge, this edge reversing the direction of travel of the web (whose direction of approach to the forming member is opposite to the direction of continuous advancement of the convoluted tube formed) and guiding the web into the convoluted cylinder and around the mandrel. The forming member is made from a thin flat plate or sheet having the general form of an isosceles right triangle whose base angles have been unevenly truncated perpendicular to the base and whose apex angle has been truncated to form an arc. To form the convoluted cylinder, the two edges of the sheet corresponding to the two truncations of the base angles are rotated about the same axis in opposite directions so that one of these edges overlaps the other, e.g., by at least about 90°, the edge corresponding to the shorter of the two truncations being the outside, or overlapping edge. The dimensions of the sheet, e.g., the length of the base of the triangle and the locations of the truncations with respect to the center of the arc, and the degree of overlap employed in forming the convoluted cylinder from the sheet depending on the dimensions of the convoluted tube which is desired and the amount of double-ply wall portion desired. The overlap in the convoluted cylindrical forming member is sufficient to provide the desired tube overlap as well as to allow a feed tube to pass through the space between plies, the feed tube being required to extend to a discharge point in the compartment formed after sealing.

The convoluted tube formed as described above has a double-ply wall portion which constitutes at least about one-fourth, and preferably constitutes at least about one-half, the wall circumference. Tubes of this type can be formed into compartmented tubes having variable-volume compartments. In most cases, the inner ply and the outer ply of the double-ply wall portion have about the same transverse dimension, or width, as in the convoluted tube shown in FIG. 1. However, if desired, the inner ply can be made longer or shorter than the outer ply, e.g., by use of a sizing ring of suitable surface contour. For example, if the sizing ring 22 (in FIG. 2) has one or more indentations in its outer surface which the inner ply is forced to enter, to the exclusion of the outer ply, while the plies are being sealed together, the inner ply will be wider than the outer ply. On the other hand, the outer ply can be made wider than the inner ply by suitable enlargement of the surface the outer ply must surround in relationship to the inner ply, e.g., by means of a filling tube which projects significantly beyond the ring's outer surface. Substantially equal-width plies are produced by partially embedding the filling tube in a notch in the sizing ring's surface, as described in the example. When the inner ply is not as wide as the outer ply, there is little or no variability in the compartmental volumes, and the volume ratio of the package components can be changed only or under- or over-loading with resulting deformation of the outer contour of the package. Thus, the shorter inner ply feature is a less preferred embodiment of the present invention.

After the compartments have been formed, a continuous stream of fluent material, i.e., a flowable solid or liquid such as a pumpable material, granular material, or extrudable paste-like material, is fed into each compartment of the continuously advancing tube. To accomplish this, the compartmented tube, after leaving the sealing area, reaches an area where the discharge ends of the filling members, e.g., hollow mandrel 11 and the smaller-diameter filling tube 12, are located and the fluent material thus is discharged into each compartment at this location continuously as the tube advances. The tube-advancing means engages the wall of the compartmented tube, and therefore is located beyond the sealing means. With smaller-diameter tubes, the tube-advancing means preferably is located between the sealing means and the discharge ends of the filling members, as this assures more efficient filling of the components.

Materials of different composition are located in the different compartments of the tube. Inasmuch as the compartmental feature of the packages produced by the present process is utilized to its best advantage with materials which, when united, form mixtures containing reactive components, the material which is fed to any compartment preferably is reactive with, or influences the reactivity of, the material in an adjacent compartment. For example, for producing rock bolt resin packages, one fluent material may be an ambient-temperature-setting, polymerizable resin composition, and another a composition which catalyzes or initiates the polymerization of the resin composition. Although non-circular, non-rigid packages can be produced by the present process as described above, preferably the compartmented tube is filled sufficiently to produce packages which have a substantially circular cross-section, and are firm and rigid, such packages being more efficient and less complex to use, e.g., in drill holes for anchoring rock bolts.

We claim:

1. A process for forming a series of compartmented packages comprising:
   (a) continuously drawing a web of pliable film material into a convoluted cylindrical forming member having at least two tubular filling members passing therethrough, said film material being formed in said forming member into a convoluted tube into which said filling members extend and which has single-ply and double-ply wall portions, said web being drawn into, and said convoluted tube being continuously advanced through and past, said forming member by tube-advancing means in frictional engagement with said tube;
   b bringing said continuously advancing convoluted tube into a confronting relationship with at least two sealing means located between said forming member and said tube-advancing means, each of said sealing means producing a seal between a pair of facing surface zones of the inner ply and outer ply of the double-ply wall portion of said tube in a manner such as to form, as the tube advances, at least two continuous linear junctures between plies substantially parallel to the longitudinal axis of said tube, one of said junctures being adjacent the inner edge and another adjacent the outer edge of said web, each pair of successive junctures and said inner ply therebetween forming two adjacent compartments, each of said filling members extending into a different one of said compartments;
   c continuously feeding a stream of fluent material into each of said filling members and discharging said material from said members into the compartments of said continuously advancing compartmented tube, the material fed into each filling member being different in composition from that fed into every other filling member;
   d bringing the filled portion of said continuously advancing compartmented tube into periodic engagement with constricting and sealing means which constricts the tube at spaced intervals and applies a pair of successive encircling closure means to each constricted area; and
   e severing said tube in the constricted area between each pair of closure means.

2. A process of claim 1 wherein said tube-advancing means engages said tube at a location between said sealing means and the discharge ends of said tubular filling members.

3. A process of claim 1 wherein the number of each of said linear junctures, compartments, and tubular filling members is two.

4. A process of claim 1 wherein said pliable film material is a biaxially oriented polymeric linear terephthalate ester film, an agent which has at least an incipient solvent action on said film is applied to the surface of said web in continuous stripes, one of said stripes being adjacent the inner edge and another adjacent the outer edge of said web, and said sealing means applies heat to the outer surface of said tube in zones which overlie said stripes.

5. A process of claim 4 wherein said agent is benzyl alcohol.

6. A process for forming a series of compartmented rock bolt resin packages comprising:
   (a) applying to the surface of a continuous web of a biaxially oriented polymeric linear terephthalate ester film two continuous stripes of an agent which has at least an incipient solvent action on said film;
   (b) continuously drawing said web into a convoluted cylindrical forming member having two tubular filling members passing therethrough, said film being formed in said forming member into a convoluted tube into which said filling members extend and which has single-ply and double-ply wall portions, each of said stripes of solvent being located in one of the mutually facing surfaces of the inner and outer plies of the double-ply wall portion of said tube and being substantially parallel to the longitudinal axis of said tube, one of said stripes being adjacent the inner edge, and the other adjacent the outer edge, of said web, said web being drawn into, and said convoluted tube being continuously advanced through and past, said forming member by tube-advancing means in frictional engagement with said tube;

(c) bringing said continuously advancing convoluted tube into a confronting relationship with two heating means located between said forming member and said tube-advancing means, said heating means applying heat to the outer surface of said tube in zones which overlie said two stripes in a manner such as to form a continuous linear juncture between plies at each of said two zones, said two linear junctures and said inner ply therebetween forming two adjacent compartments, one of said filling members being located in one of said compartments and one in the other;

(d) continuously feeding a stream of fluent material into each of said filling members and discharging said material from said members into the compartments of said continuously advancing compartmented tube, the material fed into one filling member including an ambient-temperature-setting, polymerizable resin composition and that fed into the other including a composition which catalyzes the polymerization of said resin composition;

(e) bringing the filled portion of said continuously advancing compartmented tube into periodic engagement with constricting and sealing means which constricts the tube at space intervals and applies a pair of successive encircling closure means to each constricted area; and (f) severing said tube in the constricted areas between each pair of closure means.

* * * * *